US006944096B2

(12) United States Patent
Lemenager et al.

(10) Patent No.: US 6,944,096 B2
(45) Date of Patent: Sep. 13, 2005

(54) METHOD OF ACCURATELY DETERMINING POSITIONS OF DEPLOYED SEISMIC GEOPHONES

(75) Inventors: Erwann Lemenager, Houston, TX (US); Richard Voon Choong Wong, Houston, TX (US); Carl Daniel Cooper, Katy, TX (US)

(73) Assignee: WesternGeco, L.L.C., Houston, TX (US)

( * ) Notice: Subject to any disclaimer, the term of this patent is extended or adjusted under 35 U.S.C. 154(b) by 236 days.

(21) Appl. No.: 10/224,792

(22) Filed: Aug. 21, 2002

(65) Prior Publication Data

US 2004/0037165 A1 Feb. 26, 2004

(51) Int. Cl.[7] .................................................. G01V 1/22
(52) U.S. Cl. .......................................... 367/77; 367/76
(58) Field of Search .............................. 367/76, 77, 16, 367/19; 340/825.36; 342/357.13, 357.17; 702/14; 181/112

(56) References Cited

U.S. PATENT DOCUMENTS

| 5,497,356 | A | * | 3/1996 | Norton et al. ................. 367/6 |
| 5,910,789 | A | | 6/1999 | Vigen |
| 5,955,989 | A | | 9/1999 | Li |
| 5,959,529 | A | * | 9/1999 | Kail, IV ................ 340/825.36 |
| 6,002,640 | A | | 12/1999 | Harmon |
| 6,219,620 | B1 | | 4/2001 | Park et al. |
| 6,226,601 | B1 | | 5/2001 | Longaker |
| 6,260,656 | B1 | | 7/2001 | Orban et al. |
| 6,553,316 | B2 | * | 4/2003 | Bary et al. .................... 702/16 |
| 6,560,565 | B2 | * | 5/2003 | Roy et al. ................... 702/188 |
| 6,588,980 | B2 | * | 7/2003 | Worman et al. ............ 405/158 |
| 6,741,935 | B1 | * | 5/2004 | Eschenbach ................ 701/215 |

* cited by examiner

Primary Examiner—Ian J. Lobo
(74) Attorney, Agent, or Firm—WesternGeco, L.L.C.

(57) ABSTRACT

A method is provided for accurately determining the physical location of a deployed seismic geophone used in seismic investigations by using a portable navigational satellite receiver to obtain a set of navigational satellite measurements providing the position of the deployed geophone at the time of deployment of the geophone into the earth. A method is provided for automatically and accurately identifying and determining the physical location of a deployed geophone used in seismic investigations by using one or more portable navigational satellite receivers and an automatic geophone identification and tracking system at the time of geophone deployment.

16 Claims, 5 Drawing Sheets

METHOD OF ACCURATELY DETERMINING POSITIONS OF DEPLOYED SEISMIC GEOPHONES

BACKGROUND OF THE INVENTION

1. Field of the Invention

The present invention relates to a method of obtaining land-based seismic data. More particularly, the present invention relates to a method and apparatus for accurately determining the positions of geophones deployed in a geophysical spread.

2. Description of the Prior Art

In conventional land-based seismic studies, individual (analog) seismic sensors called geophones are implanted into the earth generally along a targeted seismic survey line. Each geophone generally has a case that may be buried or coupled to an earth spike for being driven into the earth by applying an inserting force to the top of the geophone case. Each geophone is generally deployed in a vertical orientation. Geophones having an earth spike are deployed into the earth with the earth spike downwardly disposed. Soil compaction (for buried geophones) or an inserting force (for geophones having an earth spike) are applied by a seismic technician in order to ensure favorable acoustic and seismic coupling of the geophone with the earth.

Before deploying the geophone into the earth, the seismic technician estimates the desired position (with respect to geophysical requirements) for each geophone. Each geophone is positioned by stepping off a rough distance from an adjacent geophone(s) or by roughly positioning geophone(s) in a pattern about a survey peg or other benchmark placed in or near the center of the geophone group. Each geophone is generally electronically coupled to other geophones or to a seismic data recording units.

In conventional land-based seismic studies, geophones are strung in a predetermined pattern in a geophone array across the terrain of interest. A typical geophone array pattern used in land-based seismic studies is illustrated in FIG. 1. A seismic source, such as an explosive charge, an air gun or vibroseis, is positioned within or adjacent to the geophysical spread defined by the array of geophones. Sound waves emanating from the energized seismic source into the earth are reflected and refracted back to the earth's surface by subsurface geological formations of interest. Sound waves returning to the surface are sensed by the deployed geophones that are electronically coupled to one or more seismic data recording units. Recorded sound waves, or seismic data, is processed and analyzed for use in determining formation content and properties.

Conventional land-based seismic investigations require a large number of geophones, long lengths of seismic cables, and a crew of trained seismic technicians to position and deploy the geophone array for each stage of the seismic investigation. Human error, undulations in the terrain, and natural and man-made obstacles in the terrain make it difficult to obtain accurate positions for the geophones. The accuracy of the seismic data determines the quality of the seismic analysis. In order to best determine the locations of recoverable hydrocarbon deposits, the positions of the geophones must be accurately determined. What is needed is a method of accurately determining and recording the positions of geophones deployed in a seismic array over a terrain of interest. What is needed is a method for improving the accuracy of seismic data by improving the reliability of positional data for geophones.

SUMMARY OF THE PRESENT INVENTION

The present invention provides a method of recording the position of geophones while deploying the geophones on the terrain made the subject of a seismic investigation. If the position of the geophone is accurately determined at the time of each geophone deployment, no further positional measurements are necessary because the position of the geophone does not change during the seismic investigation.

The method of the present invention is used in conjunction with at least one portable navigational satellite receiver that is operable at or very near the position of the seismic technician that deploys geophones in the terrain. The portable navigational satellite receiver is used to accurately determine the physical position of the deployed geophone at or very near the time of deployment of the geophone. A controller is used to record positional measurements of the deployed geophone in an electronic data storage device, or memory. The recorded positional measurements of each geophone is electronically paired with a unique identification code for that geophone, and this data pair is stored in the memory or physical data storage.

The method of the present invention may be highly automated. For instance, each geophone may be equipped with a small high frequency (HF) radio transmitter and a dedicated accelerometer or other device specifically designed to sense deployment of the geophone into the ground. Portable equipment carried by the seismic technician may include a geophone data receiver for receiving a radio or other signal from the geophone. The signal received by the geophone data receiver from the geophone may contain the unique identification code and other data for that geophone. In one embodiment, the geophone data receiver may receive and read an HF radio signal produced by the geophone upon deployment. Alternately, the geophone may comprise a passive or an active electronically detectable transponder for communicating the unique geophone identification code of the deployed geophone to a geophone data receiver in response to electronic activation of the electronically detectable transponder by a reader antennae brought into close proximity or contact with the geophone case. Embodiments of this system provide a reader antennae disposed on a pole or even on a shoe worn by the seismic technician. In the latter embodiment, the reader polls the electronically detectable transponder disposed of the geophone when the technician uses the shoe to compact soil or to force the geophone into the earth.

The present invention also provides a method for accurately deploying geophones in a predetermined pattern or geophone array without the difficulty, expense and time required for measuring and laying out the position of each geophone relative to a survey benchmark or to adjacent geophones. The preferred embodiment of the present invention utilizes at least one portable navigational satellite receiver and either a stationary navigational satellite receiver operated at a known location or a broadcast navigational satellite correction system for providing corrections for the measurements made using the portable navigational satellite receiver.

The term "positional measurement," as that term is used herein, is not limited to longitude and latitude measurements, or to metes and bounds, but includes information in any form from which geophysical positions can be derived. These include, but are not limited to, the distance and direction from a known benchmark, measurements of the time required for certain signals to travel from a known source to the geophysical location where the signals may be electromagnetic or other forms, or measured in terms of phase, range, Doppler or other units. The inventions disclosed herein are applicable to use with the Global Positioning System (GPS), the Global Navigational Satellite System (GNSS), and with any network of navigational satellites generally using triangulation to determine a geophysical location of an earthbound object. The term "satellite signal," as used herein, includes any signal originating from a navigational satellite and electronically, optically or otherwise detectable at the earth's surface using instruments. The term "satellite measurement," as used herein, includes any determination of a geophysical location using satellite signals originating from navigational satellites.

BRIEF DESCRIPTION OF THE DRAWINGS

So that the features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not be considered limiting of its scope, for the invention may admit to other equally effective embodiments. These drawings are not to scale, and the relative sizes of objects depicted therein may be exaggerated so that features and interrelationship of components may be better seen and understood. For example, but not by way of limitation, the instruments case to be carried by the seismic technician may actually be the size of a cellular telephone and may be clipped or secured to the belt, but is depicted in the drawings in a larger size to show the presence of all of the instruments that may be integrated into a compact device.

DETAILED DESCRIPTION OF THE PRESENT INVENTION

Figure 1:
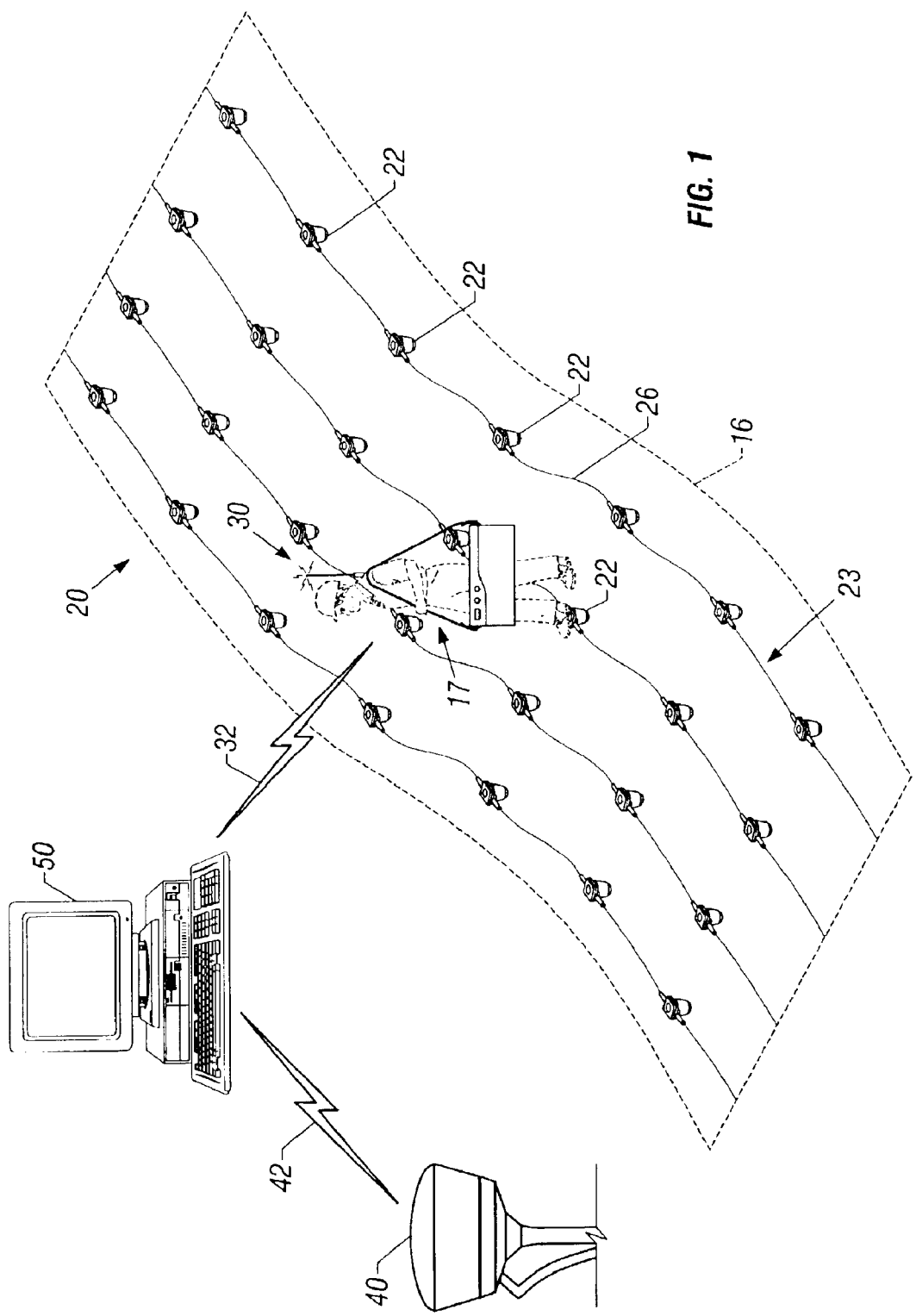
FIG. 1 is a schematic of a typical seismic geophysical spread of terrain having multiple geophones disposed therein to facilitate a seismic investigation of subsurface geological formations.

FIG. 1 depicts a typical seismic spread 20 of terrain having multiple geophones 22 disposed therein to facilitate a seismic investigation of subsurface geological formations lying beneath the terrain. The geophones 22 are generally coupled one to others by cables 26, thereby forming seismic strings 23 having a series of geophones 22 cabled together in electronic communication. The seismic strings 23 in FIG. 1 are deployed in a generally parallel configuration to achieve the desired seismic coverage with generally uniform distribution and spacing of the geophones 22. The seismic strings 23 are deployed to cover the area of the seismic investigation, or the seismic spread 20.

Figure 2:
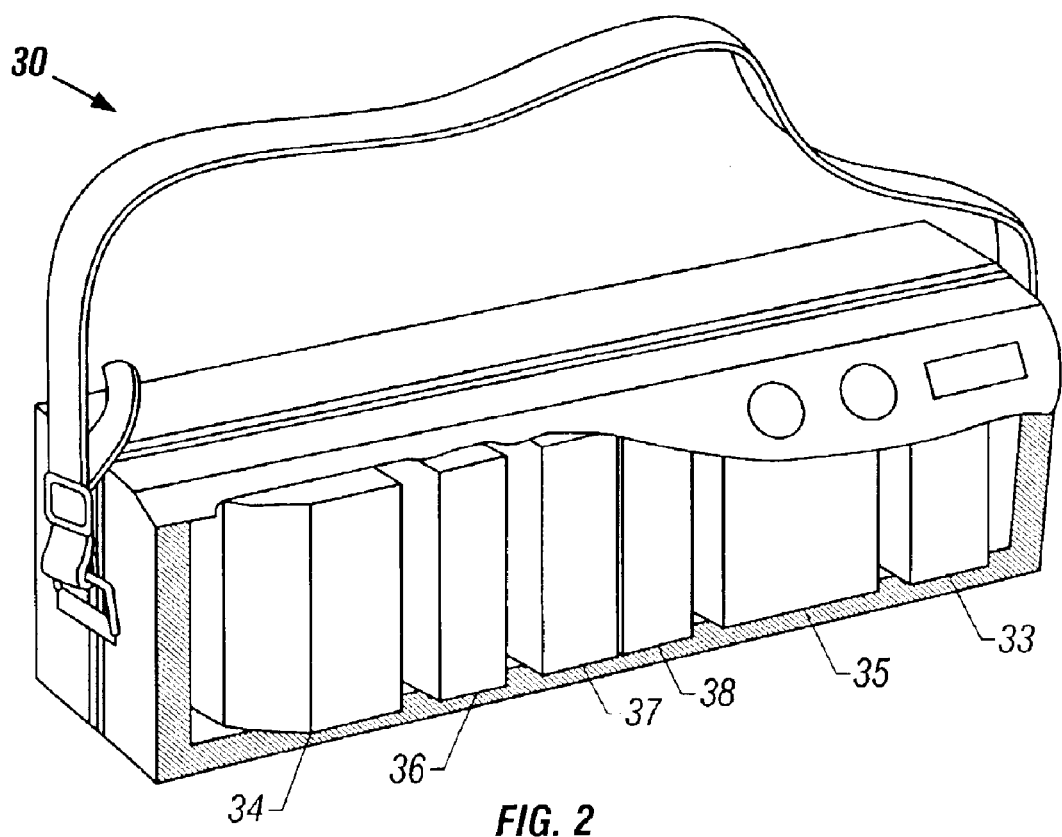
FIG. 2 is a schematic showing one arrangement of instruments that may be carried within a portable instrument case used in an embodiment of the present invention.

FIG. 2 shows an embodiment of the portable instruments case 30 of the present invention. The instruments contained in the instruments case 30, or otherwise transported to the general location of each geophone deployment, comprise a geophone data receiver 33, a controller 34, navigational satellite receiver 35, a power source 36, and a memory 38. The memory 38 may be any of several types of electronic, magnetic or electromagnetic data storage devices known to those skilled in the art for use with portable data gathering devices such as those portable devices used by parcel services or inventory systems, residential utility meter readers or the like. The data storage could be in either an internal memory of a portable device or a removable extension to the portable device. The instruments case 30 may also include, or be connectable to, lights, gauges, display screens (LDC or LED), audible signals and vibrators, all for interfacing with or communicating information to the seismic technician 17 (see FIG. 4). Optionally, a data transmitter 37 may be included for providing continuous or periodic communication of data received by the geophone data receiver 33 to a remote database such as the database on a computer 50 (refer to FIGS. 1 or 4). The optional data transmitter 37 in FIGS. 2 and 4 may be of several types of transmitters that are known to those skilled in the art for transmitting data, including those using radio waves or cellular technology. Preferably, the data transmitter 37 is an HF radio transmitter. The instruments in the instruments case 30 are preferably arranged in a compact and portable configuration.

The power source 36 in the instruments case 30 shown in FIG. 2 may be any type of electrical power source, including a solar panel or any of several types of batteries known to those skilled in the art for powering portable electronic devices. Alternately, fuel cells can be adapted for consuming fuel, such as hydrogen, methanol or compressed natural gas, and for efficiently converting that fuel to electrical power to operate the components of the present invention.

Figure 3:
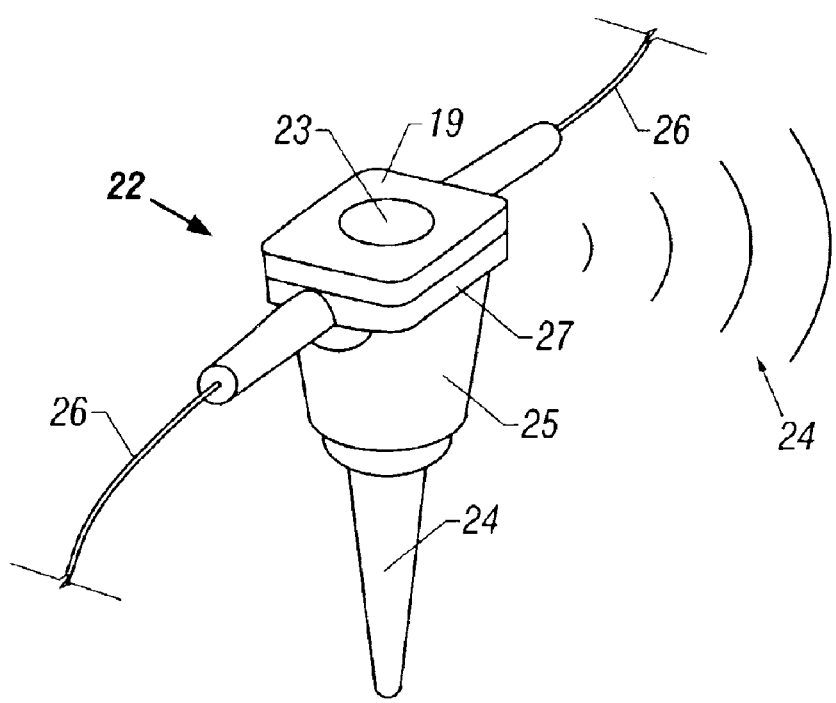
FIG. 3 is a schematic of an embodiment of a geophone for use with the present invention for sensing and communicating seismic returns during a seismic investigation.

Geophones may be designed to rest upon the ground, be buried in the ground or be driven into the ground using an earth spike. FIG. 3 depicts one embodiment of a geophone 22 for sensing acoustic or seismic waves during seismic investigations and having an earth spike 24 adapted for being forcefully driven into the earth. The geophone 22 of FIG. 2 comprises an earth spike 24 rigidly coupled to the geophone case 25. Optionally, a top surface 23 of the geophone 22 may be used to communicate the unique identification code from the geophone 22 to the geophone data receiver 33 (refer to FIG. 2). A label 19 may be placed on the top surface 23 of the geophone 22. The label 19 may be used to visually or optically display the unique identification code for reading and recording by the seismic technician. For cabled geophones, cable 26 physically and electronically couples each geophone 22 to at least one adjacent geophone or, directly or indirectly, to a seismic data recorder.

Figure 4:
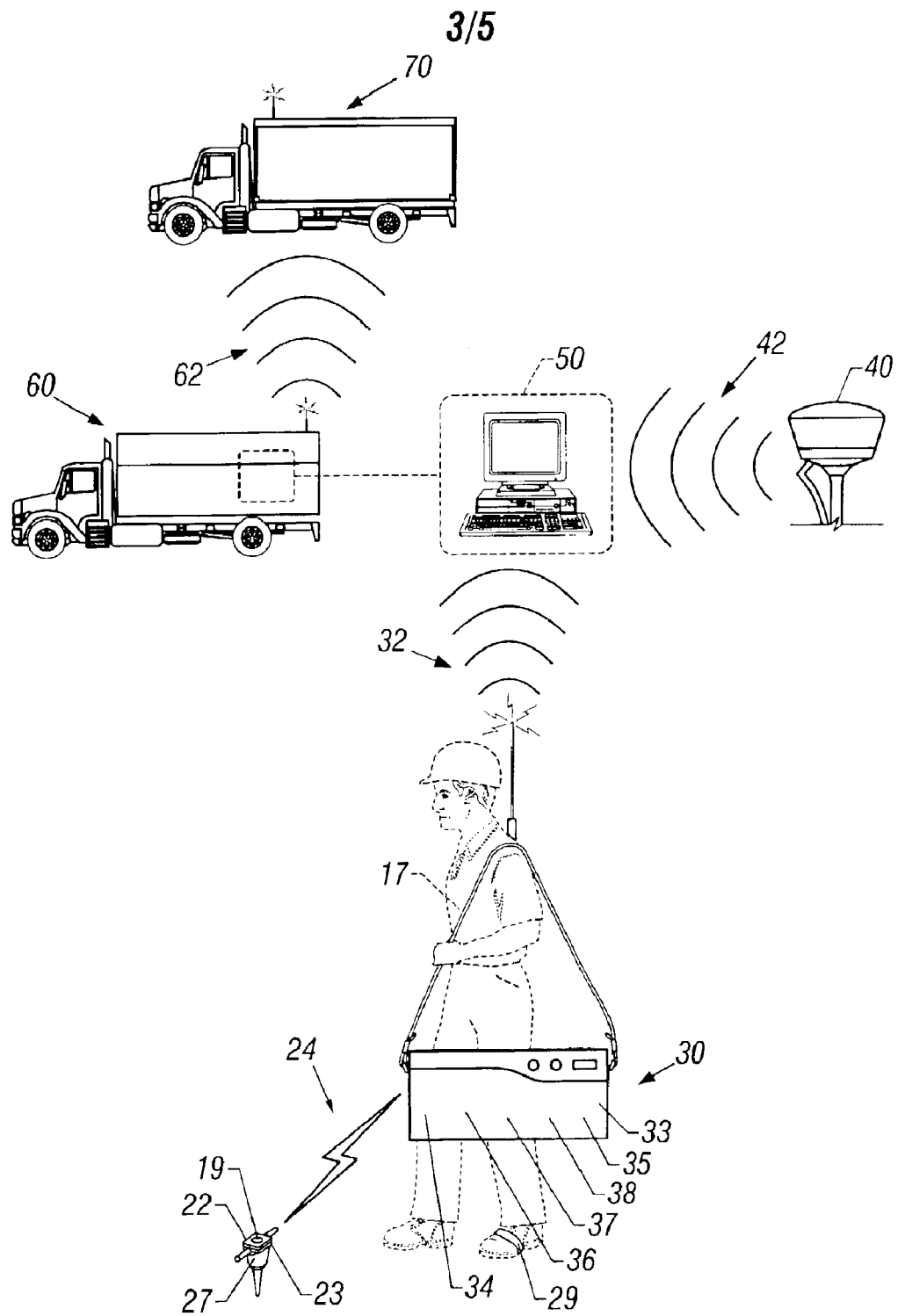
FIG. 4 illustrates data communication among the equipment or devices that may be used in an embodiment of the present invention.

FIG. 4 shows a seismic technician 17 carrying an instrument case 30 while deploying geophones 22. FIG. 4 illustrates the data communication among certain components of the system of the present invention. In the embodiment shown, a stationary navigational satellite receiver 40 is positioned in or adjacent to the geological spread 20 in which the geophones 22 are deployed (refer to FIG. 1). A computer 50 wirelessly communicates with the stationary navigational satellite receiver 40 such as by radio waves 42. Also, the computer 50 wirelessly communicates with the instruments case 30 carried by the seismic technician 17 such as by radio waves 32. The instruments case 30 may continuously communicate data gathered from geophones 22 as it is gathered or, alternately, the instruments case 30 may accumulate and store data gathered from multiple geophones 22, and then upload accumulated data in batch to the computer 50 by radio waves 32. Alternately, geophone data may be accumulated and stored in the instruments case 30 for data uploading by hard-wired connection at a later time.

The unique identification code of the geophone 22 may be transmitted to the geophone data receiver 33 by several means. In one embodiment of the present invention, the unique identification code is read by the seismic technician 17 from a label 19 on the top surface 23 of the geophone 22, and entered by the seismic technician 17 into the controller 34 using a numeric or alphanumeric keypad. In another embodiment of the present invention, the unique identification code may be optically scanned using OCR technology from a bar code placed on a label 19 on the top surface 23 of the geophone 22. In another embodiment of the present invention, a "smart card" having the unique identification code electronically or magnetically stored thereon is disposed on the geophone 22 when the "smart card" is brought into close proximity or contacted with a card reader carried by the seismic technician, the unique identification code is read. In another embodiment, the geophone data receiver 33 may be a high frequency (HF) radio receiver for wirelessly receiving an HF signal 24 containing unique identification code of the geophone 22. The geophone 22 may be adapted to comprise an activatable electronically detectable transponder 27 (see FIGS. 3 and 4), and the transponder 27 may comprise an HF radio signal transmitter. In the preferred embodiment, the unique identification code of the geophone 22 is communicated to the geophone data receiver 33 upon activation of the transponder 27 by the reader antennae 29. In each of these embodiments, the unique identification code is received by the geophone data receiver 33, then stored in the memory 38 by the controller 34 and communicated, using the data transmitter 37, either continuously or batchwise, via radio signal 32 to the computer 50.

In the preferred embodiment of the present invention, the unique identification code of the geophone 22 is electronically and transmittably stored in an electronically detectable transponder 27 (see FIG. 3), such as those widely used in security badges and tollway electronic payment systems. The geophone data receiver 33 is coupled to a reader antennae 29 that electronically polls and communicates with the transponder 27 when the reader antennae 29 is brought into close proximity or contact with the transponder 27. The geophone data receiver 33 polls the transponder 27 when brought into close proximity or contact with the antennae reader 29 and thereby electronically or magnetically receives the HF signal 24 containing the unique identification code of the geophone 22.

In one embodiment, the geophone data receiver 33, upon receiving the unique identification code of the geophone 22, communicates the unique identification code or other data to the controller 34. At or near the time that the unique identification code is communicated from the geophone 22 to the geophone data receiver 33, the navigational satellite receiver 35 obtains a set of positional measurements of the navigational satellite receiver 35 at about the time that the geophone data receiver 33 receives the unique identification code of the geophone 22. This provides a raw navigational satellite position of the deployed geophone 22. Improved accuracy may require that the navigational satellite receiver 35 be held in close proximity to the geophone 22 for a period of time after the geophone data receiver 33 receives the unique identification code provided by the geophone 22. Accuracy may also be improved by adapting the navigational satellite receiver 35 and the reader antennae 29 at spaced apart positions on an elongate shaft, which when held vertically over the geophone 22, would align the navigational satellite receiver 35 with the exact location of the deployed geophone 22, or by measuring the offset between the navigation satelitte receiver 35 and the reader antennae 29 or the geophone 22

Other data may also be obtained and stored in the memory 38. Optionally, the time of receiving the geophone unique identification code or the time of obtaining the related portable navigational satellite receiver measurement, or both, may be recorded and stored in the memory 38. The controller 34 may store the unique identification code of the geophone 22, along with the time at which the unique identification code was received, in the geophone data receiver 33. Alternately, the controller 34 may store the positional measurement obtained by the navigational satellite receiver 35 along with the time at which the positional measurement was made in the memory 38. The data may then be processed, either in the controller 34 or after uploading to a database on the computer 50. This allows for "time-window" correlation of geophone navigational satellite positions with the corresponding unique identification codes, broadcast navigational satellite corrections or other data manipulation. Alternately, no time measurements may be made, and the geophone unique identification code of a geophone may be correlated to the corresponding navigational satellite position measurement based on the order in which it was recorded.

The function of navigational satellite receiver 35 is well known in the art. The navigational satellite receiver 35 in FIGS. 2, 4 and 5 generally uses triangulation to measure its distance from three or more orbiting satellites like the one illustrated in FIG. 5. The navigational satellite receiver 35 actually measures its distance from a satellite by measuring the time required for a satellite signal originating from the satellite 90 (see FIG. 5) to reach the portable navigational satellite receiver 35 and comparing that time to the amount of time required for a satellite signal to reach another navigational satellite receiver. By using multiple navigational satellite receivers, the comparison of the differences in the time required for satellite signals to be received from the navigational satellite improves positional measurement accuracy. Repeating this process using the signal from a second, third and perhaps additional satellites enables very accurate navigational satellite positioning. Signals originating from navigational satellites are either single or multi-band, and either or both of these bands may be used in determining positional measurements using navigational satellites.

Corrections to navigational satellite measurements are generally necessary to correct for the influence of atmospheric conditions, electrostatic or electromagnetic interference or for errors in the broadcast satellite ephemeredes that may be present at the time of a measurement. The error correction may be obtained by subtracting or differencing the navigational satellite measurements obtained from the stationary and portable navigational satellite receivers. Alternately, navigational satellite corrections are broadcast by data service providers including Chance & Chance Technologies, Inc. of Lafayette, La. and others.

The computer 50, shown in FIG. 4 to be on board a field data truck 60, receives the unique identification code, the corresponding navigational satellite receiver 35 measurements and, optionally, the approximate time of the navigational satellite measurement, all from the data transmitter 37 by radio waves 32. The computer 50 also receives either a corresponding positional measurements made using the stationary navigational satellite receiver 40 for use in correcting the measurements made by the navigational satellite receiver 35 or a broadcasted navigational satellite correction such as the DGPS data available from the C-Nav system provided by Chance & Chance Technologies, Inc. of Lafayette, Louisiana. Either the stationary navigational satellite receiver 40 or the broadcasted navigational satellite correction data provides a correction for the then existing conditions existing at or about the time of the measurements by the portable navigational satellite receiver 35, including atmospheric conditions, electromagnetic interference or for errors in the broadcast satellite ephemerides. For the purpose of illustrating the invention, FIG. 4 shows an embodiment of the present invention using the stationary navigational satellite receiver 40 to provide the needed corrections. The central data processing computer 50 uses the correction provided by the navigational satellite receiver 40 to correct the portable navigational satellite receiver 35 measurements received via radio waves 32 from the data transmitter 37. Alternatively, the truck may carry a navigational satellite receiver. The positions of the truck, while it is stationary or in motion, are determined by either differencing the data with those from the stationary receiver or by removing the errors in the data directly with the computed corrections. These positions, and the navigational satellite receiver data, collected are then combined with the satellite data from the portable receivers to estimate their locations.

Figure 5:
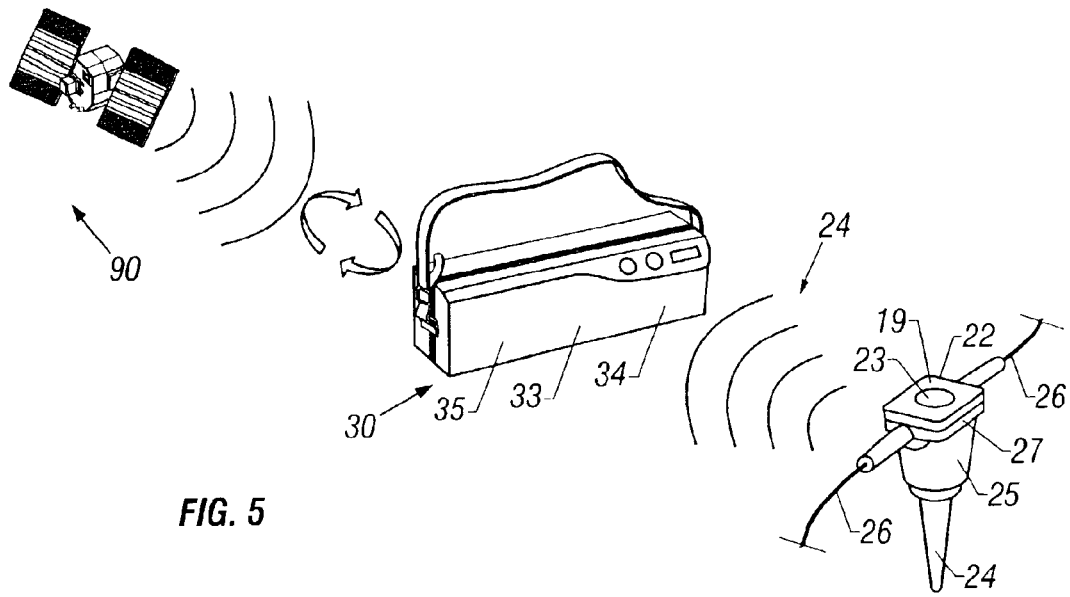
FIG. 5 is an illustration of geophone data being communicated to a portable instrument case upon deployment of a geophone into the earth in accordance with an embodiment of the present invention.

FIG. 5 is an illustration of the interface of the navigational satellite satellites 90, the navigational satellite receiver 35, the geophone data receiver 33 and the geophone 22 upon deployment of the geophone 22 into the earth. The navigational satellite receiver 35 interacts with a plurality of orbiting satellites 90 (only one shown in FIG. 5 for simplicity) to obtain a raw navigational satellite position of the navigational satellite receiver 35 at the time that the geophone data receiver 33 receives the unique identification code of the geophone 22. In another embodiment, the navigational satellite receiver 35 obtains raw navigational satellite positional measurements continuously during a time window around the time that the geophone data receiver receives the unique identification code from the geophone 22. In this embodiment, the position of the geophone 22 may be determined by associating the time of receipt of the unique identification code with a filtered and estimated position of the navigational satellite receiver 35 during the window of time around the receipt of the unique identification code by the geophone data receiver. Correction of navigational satellite receiver data may include interpolation, smoothing and statistical processing including, but not limited to, averaging, weighted averaging or obtaining the standard deviation or mean of the data. The raw positional measurements obtained by the portable navigational satellite receiver 35 at or near the time that the geophone 22 is deployed into the earth is processed in the computer 50 (not shown in FIG. 5; see FIGS. 4 and 6) to provide a corrected geophysical location of the navigational satellite receiver 35 with an accuracy of about 0.7 meters (1σ, i.e. 68%) or less. The accuracy may depend on the location and the stationary time at the position of interest.

Optionally, a stationary navigational satellite receiver 40 may be used to continuously obtain and record stationary navigational satellite receiver 40 readings that can be used to correct raw measurements obtained by the navigational satellite receiver 35. In this embodiment, the correction used to correct a measurement by the navigational satellite receiver 35 may be a filtered and corrected result of the corrections obtained within a predetermined window of time around the navigational satellite receiver 35 measurement to be corrected. The use of the term "stationary," as used herein for the stationary navigational satellite receiver 40, does not necessarily mean permanently affixed to the earth, but rather remaining in one known location during the deployment of a plurality of geophones.

Figure 6:
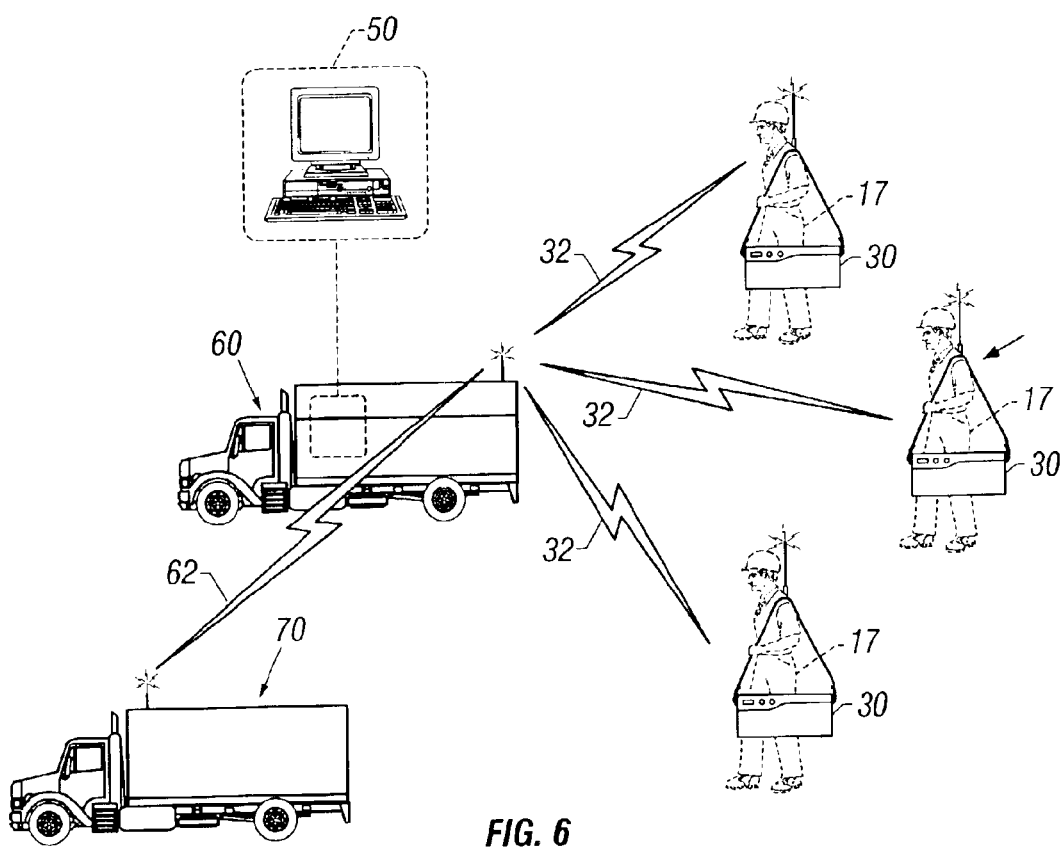
FIG. 6 is an illustration of an embodiment of the present invention used for providing directional deployment of geophones by a plurality of seismic technicians.

FIG. 6 is an illustration of an embodiment and method of the present invention used to facilitate the deployment of geophones for four-dimensional (4D) seismic investigations using the present invention. In this embodiment, recorded geophysical locations of geophones used in obtaining seismic data in a previous seismic investigation are stored in the database in the computer 50. The computer 50 monitors the positions of portable navigational satellite receivers carried by each seismic technician 17 and compares the positions to the stored geophone location data from the previous seismic investigation. The computer 50 provides directions to the seismic technicians 17 by radio waves 32 for targeted deployment of the geophones into the terrain at or near the same geophysical locations of geophones used to sense and gather seismic data in the previous seismic investigation. This method provides enhanced seismic repeatability by providing an almost identical seismic array as was used in the previous seismic investigation, the only material difference being time. Analysis and comparison of the results of the two (or more) "overlaid" seismic investigations of the same terrain reveals changes in the hydrocarbon reservoir of interest over time and enables the tracking of movements in recoverable hydrocarbon reserves, water fronts advanced by water flooding, gas fronts advanced by miscible or immiscible gas displacement flooding, gas cap expansion, oil/water contact encroachment and other reservoir properties that may otherwise remain undetectable.

Figure 7A:
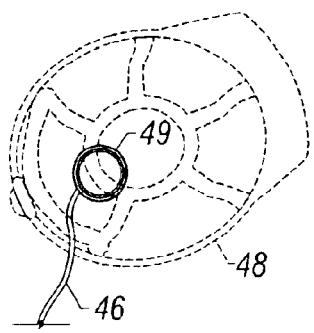
FIG. 7A is an overhead view of an embodiment of the present invention comprising a navigational satellite sensor disposed within a helmet to be worn by the seismic technician while deploying geophones in a seismic spread.
Figure 7B:
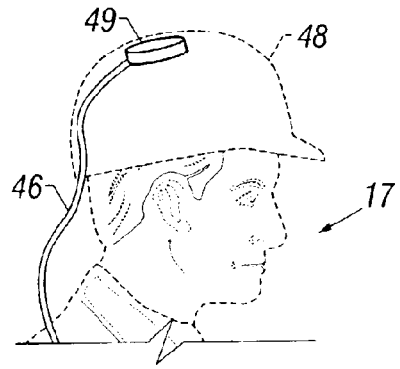
FIG. 7B is a side elevation view of the embodiment of the helmet of FIG. 7A being worn on the head of the seismic technician.

FIGS. 7A, 7B, 7C, 8A and 8B illustrate the preferred equipment for implementing the present invention as it may be integrated into items to be worn or carried by the seismic technician. FIG. 7A shows one embodiment of a helmet 48 on which is disposed at least one navigational satellite sensor 49. The navigational satellite sensor 49 is electronically coupled to a GPS receiver in the instruments case 30 (see FIGS. 3, 4 and 8A) by a navigational satellite sensor cable 46. As shown in FIG. 7B, the helmet 48 is worn on the head of the seismic technician 17 with the navigational satellite sensor 49 disposed upwardly.

Figure 7C:
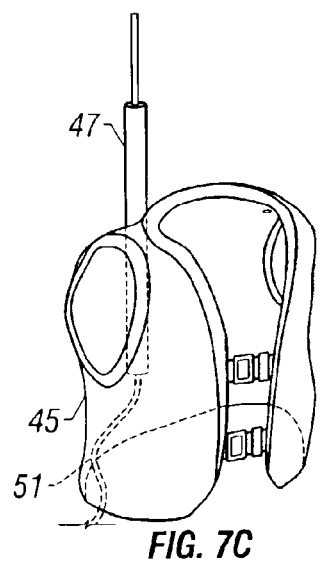
FIG. 7C is a schematic of an embodiment of the present invention comprising an HF radio antennae adapted for being disposed onto a vest to be worn by the seismic technician.

FIG. 7C shows an embodiment of a data transmission antennae 47 electronically coupled to the data transmitter 37 (in the instruments case; see FIGS. 3, 4 and 8A) by an antennae cable 51 and coupled to a vest 45 to be worn by the seismic technician during deployment of geophones. Alternately, one or more satellite or radio antennas may be placed on an elongated shaft. Data including the unique identification code of the deployed geophones, the time of each geophone deployment corresponding to each unique identification code, the corresponding portable navigational satellite receiver measurements and other data may be uploaded to a remote computer using the data transmitter 37 coupled to the data transmission antennae 47 by the antennae cable 51.

Figure 8A:
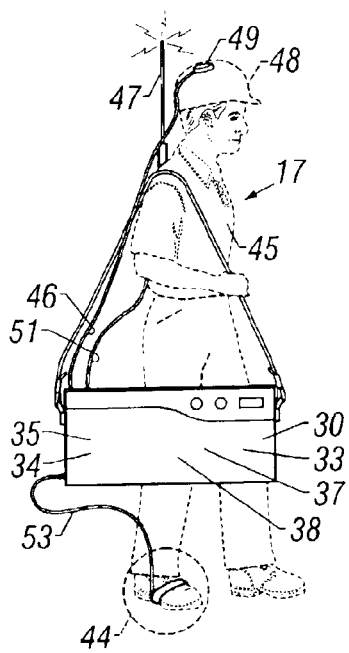
FIG. 8A is an embodiment of equipment used to implement the present invention being worn and carried by the seismic technician while deploying geophones.
Figure 8B:
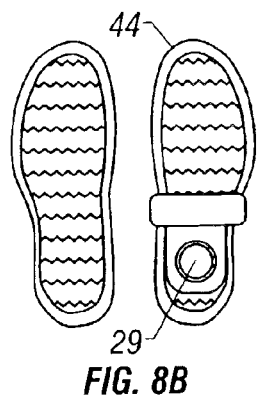
FIG. 8B is a schematic of an embodiment of a reader antennae of the present invention disposed on the sole of a shoe to be worn on the foot of the seismic technician for obtaining data from an electronically detectable transponder disposed in the geophone case.

The seismic technician wears the helmet 48 and the vest 45 as shown in FIG. 8A. FIGS. 8A and 8B show one embodiment of a reader antennae 29 disposed on the shoe 44 worn on the foot of the seismic technician 17. The reader antennae 29 is electronically coupled to the geophone data receiver 33 by the antennae cable 53. The unique identification code received by the antennae reader 29 from the transponder 27 of the geophone 22 is communicated to the geophone data receiver 33 (not shown in FIGS. 7A–8B) and to the controller 34. The controller 34 then records the unique identification code of the geophone in the memory 38 (also not shown in FIGS. 7A–8B).

By way of example, the present invention may also be used to deploy and recover anti-tank, anti-personnel and other types of land mines. The same equipment and methods described for use in connection with geophones and seismic systems is equally useful for recording the positions of deployed land mines, and for later recovering deployed land mines. Although the method of activating the data transmitter in a land mine may require more care due to the dangers inherent with land mines, the equipment and methods described herein for use in connection with seismic geophones are equally applicable to the recordation of positions of deployed land mines, and to directing technicians in their recovery or destruction of deployed land mines.

As will be readily apparent to those skilled in the art, the present invention may easily be produced in other specific forms and methods without departing from its spirit or essential characteristics. The present method is, therefore, to be considered as merely illustrative and not restrictive. The scope of the invention is indicated by the claims that follow rather than the foregoing description, and all changes which come within the meaning and range of equivalence of the claims are therefore intended to be embraced therein.

The scope of the invention is indicated by the claims that follow rather than the foregoing description, and all changes which come within the meaning and range of equivalence of the claims are therefore intended to be embraced therein.

We claim:

1. A system for determining the position of one or more geophones each having a unique identification code, comprising:

a transmitter operatively connected to each geophone for wirelessly transmitting a signal representing the geophone's unique identification code; and a portable locator, comprising:

a receiver for wirelessly receiving the signals transmitted by each transmitter;

a navigational satellite receiver for providing a positional measurement for each geophone when the portable locator is moved to a location at or near the position of each geophone; and a data storage device for recording the unique identification code and the positional measurement for each geophone.

2. The system of claim 1, wherein:

the transmitter is part of a transponder operatively connected to each geophone for wirelessly transmitting a signal representing the unique identification code when the portable locator is moved to a location near the position of the geophone.

3. The system of claim 2, wherein:

the portable locator further comprises a reader antenna operatively coupled to the receiver.

4. The system of claim 3, wherein:

the reader antenna is adapted for wearing on the foot off an operator, thereby facilitating placement of the reader antenna in proximity with each transmitter.

5. The system of claim 1, wherein:

the portable locator further comprises a transmitter for transmitting signals representative of data recorded by the data storage device.

6. The system of claim 5, further comprising:

a computer having a receiver for receiving the signals transmitted by the portable locator transmitter.

7. The system of claim 1, further comprising:

a stationary navigational satellite receiver placed in a known positional for obtaining a benchmark navigational satellite measurement within a defined time of the positional measurement provided by the portable navigational satellite receiver for each geophone;

wherein the positional measurements of the portable navigational satellite receiver are corrected by differencing them with respect to the benchmark measurements from the stationary navigational satellite receiver.

8. The system of claim 1, further comprising:

a moving navigational satellite receiver for obtaining a benchmark navigational satellite measurements within a defined time of the positional measurements provided by the portable navigational satellite receiver for each geophone;

wherein the positional measurements of the portable navigational satellite receiver are corrected by differencing them with respect to the benchmark measurements from the moving navigational satellite receiver.

9. The system of claim 1, further comprising:

a broadcasted radio or satellite signal providing a navigational satellite corrections within a defined time of the positional measurement provided by the portable navigational satellite receiver for each geophone;

wherein the positional measurements of the portable navigational satellite receiver are corrected by applying the broadcast corrections to the positional measurements.

10. The system of claim 1, wherein:

the transmitter and receiver are adapted for respectively transmitting and receiving high frequency radio signals.

11. A method for determining the position of one or more geophones coupled to the earth in a seismic survey, each geophone having a unique identification code, comprising the stops of:

wirelessly transmitting from a location at or near each geophone a signal representing the geophone's unique identification code; and using a portable locator for:

wirelessly receiving the transmitted unique identification code signals;

wirelessly receiving a navigational satellite signal for providing a positional measurement for each geophone; and recording the unique identification code and the positional measurement for each geophone.

12. The method of claim 11, wherein:

the wirelessly-transmitting step occurs when the portable locator is moved to a location at or near the position of each geophone.

13. The method of claim 11, wherein:

the wirelessly-receiving step comprises placing a reader antenna in proximity with each geophone.

14. The method of claim 11, further comprising the step of:

transmitting signals representative of the recorded unique identification codes and positional measurements to a computer having a receiver.

15. The method of claim 11, further comprising the steps of:

obtaining a benchmark navigational satellite measurement within a defined time of the positional navigational satellite measurement for each geophone; and correcting the positional navigational satellite measurement using the benchmark measurements.

16. A system for determining the position of one or more geophones each having a unique identification code, comprising:

one or more transmitters operatively connected to each geophone for wirelessly transmitting one or more signals representing the geophone's unique identification code and the seismic survey data sensed by the geophone; and a portable locator, comprising:

a receiver for wirelessly receiving the signals transmitted by each transmitter;

a navigational satellite receiver for providing a positional measurement for each geophone when the portable locator is moved to a location at or near the position of each geophone; and a data storage device for recording the unique identification code and the positional measurement for each geophone.

* * * * *